US012266863B2

(12) United States Patent
Sakurai et al.

(10) Patent No.: US 12,266,863 B2
(45) Date of Patent: Apr. 1, 2025

(54) HIGH-FREQUENCY DEVICE

(71) Applicant: DENSO CORPORATION, Kariya (JP)

(72) Inventors: Kazumasa Sakurai, Nisshin (JP); Kazushi Kawaguchi, Kariya (JP); Junzoh Tsuchiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/663,466

(22) Filed: May 16, 2022

(65) Prior Publication Data

US 2022/0278464 A1 Sep. 1, 2022

Related U.S. Application Data

(63) Continuation of application No. PCT/JP2020/042615, filed on Nov. 16, 2020.

(30) Foreign Application Priority Data

Nov. 18, 2019 (JP) ................................ 2019-208005

(51) Int. Cl.
*H01Q 21/06* (2006.01)
*H01Q 1/48* (2006.01)

(52) U.S. Cl.
CPC ............ *H01Q 21/065* (2013.01); *H01Q 1/48* (2013.01)

(58) Field of Classification Search
CPC .............................. H01Q 21/065; H01Q 1/48
See application file for complete search history.

(56) References Cited

U.S. PATENT DOCUMENTS

2009/0315648 A1 12/2009 Toyao
2010/0134213 A1 6/2010 Kim et al.
2013/0314285 A1* 11/2013 Takasaki ................ H01Q 1/48 343/700 MS
2014/0049437 A1 2/2014 Hung et al.
2014/0300428 A1 10/2014 Toyao
2014/0300429 A1 10/2014 Toyao
2015/0070246 A1 3/2015 Maruyama et al.
2015/0102977 A1* 4/2015 Lockyear ............ H01Q 9/0407 343/893
2016/0344093 A1 11/2016 Tagi et al.
2019/0051977 A1 2/2019 Kawaguchi et al.
2020/0052396 A1 2/2020 Sakai et al.

FOREIGN PATENT DOCUMENTS

JP 2015043526 A 3/2015
WO WO-2018198970 A1 * 11/2018 .............. H01Q 1/28

* cited by examiner

*Primary Examiner* — Henry Luong
(74) *Attorney, Agent, or Firm* — Maschoff Brennan

(57) ABSTRACT

A dielectric substrate includes a plurality of pattern layers. A ground plate to be used as a ground plane is formed in a first pattern layer of the dielectric substrate. A functional unit includes a plurality of conductive patches that are parasitic patterns formed in a second pattern layer different from the first pattern layer. The conductive patches are periodically arranged, and sides of the conductive patches along at least one direction are set at a length to cause resonance of a radio wave that propagates through a surface of the dielectric substrate.

8 Claims, 11 Drawing Sheets

FIG.7

| | Lα | Lβ | g |
|---|---|---|---|
| PATTERN 1 | 1.1 | 0.86 | 0.15 |
| PATTERN 2 | 1.06 | 0.84 | 0.15 |
| PATTERN 3 | 1.04 | 0.82 | 0.15 |
| PATTERN 4 | 1.02 | 0.8 | 0.2 |
| PATTERN 5 | 1 | 0.78 | 0.2 |

HIGH-FREQUENCY DEVICE

CROSS-REFERENCE TO RELATED APPLICATION

The present application is a continuation application of International Application No. PCT/JP2020/042615, filed on Nov. 16, 2020, which claims priority to Japanese Patent Application No. 2019-208005, filed in Japan on Nov. 18, 2019. The contents of these applications are incorporated herein by reference in their entirety.

BACKGROUND

1. Technical Field

The present disclosure relates to a high-frequency device using a dielectric substrate.

2. Related Art

There are patch antennas as high-frequency devices that implement various functions in accordance with patterns formed on dielectric substrates. In a case where this type of patch antenna is used as an antenna of an in-vehicle radar, for example, the patch antenna is mounted inside a bumper. Radio waves emitted from the patch antenna and reflected by the bumper interfere with radiated waves by being reflected again by a surface of the dielectric substrate on which an antenna pattern is formed, which leads to degradation of antenna characteristics.

SUMMARY

The present disclosure provides a high-frequency device. As an aspect of the present disclosure, a high-frequency device includes at least a dielectric substrate, a ground plate, and a functional unit. The dielectric substrate has a plurality of pattern layers. The ground plate is formed in a first pattern layer of the dielectric substrate and is used as a ground plane. The functional unit includes a plurality of conductive patches that are parasitic patterns formed in a second pattern layer different from the first pattern layer of the dielectric substrate. The conductive patches are periodically arranged, and sides of the conductive patches along at least one direction are set at a length such that a radio wave propagates through the surface of the dielectric substrate undergoes resonance. That is, the sides of the conductive patches along at least one direction are set at the length to cause resonance of a surface wave.

BRIEF DESCRIPTION OF THE DRAWINGS

In the accompanying drawings:

FIG. 7 is a list of design examples of a functional unit that provides a reflection phase difference of 180° and a reflection prevention effect of equal to or greater than 10 dB;

DETAILED DESCRIPTION OF THE PREFERRED EMBODIMENTS

Figure 1:
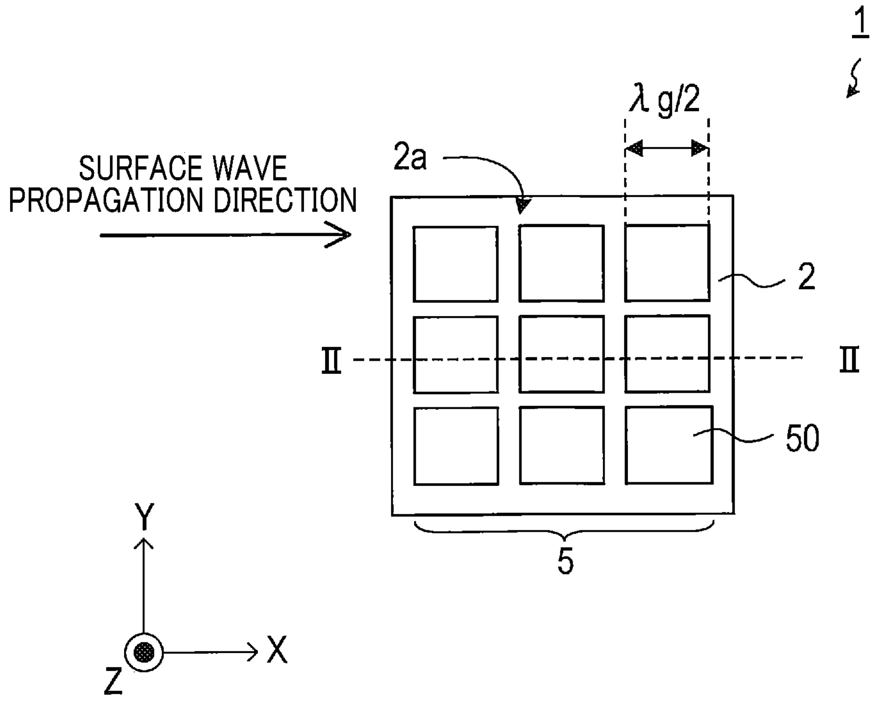
FIG. 1 is a plan view schematically illustrating a configuration of a high-frequency device according to a first embodiment.

JP 2014-45378 A (Japanese Unexamined Patent Application Publication No. 2014-45378) describes a technique of preventing influence by reflection by arbitrarily controlling a reflection direction of an incident wave from a front direction, reflected by a bumper using a reflect array having an electromagnetic bandgap (that is, EBG) structure. The EBG structure has a structure in which a plurality of patches to be connected to a ground plate via vias are regularly arranged.

However, as a result of detailed examination, the inventors have found that the related art described in JP 2014-45378 A has a problem that the related art is not suitable for a surface wave that propagates through a substrate surface, and cannot prevent adverse influence on the antenna characteristics caused by the surface wave.

One or more aspects of the present disclosure are directed to a technique of preventing the antenna characteristics from being influenced due to a surface wave that propagates through a surface of a dielectric substrate.

One aspect of the present disclosure is a high-frequency device including a dielectric substrate, a ground plate, and a functional unit. The dielectric substrate has a plurality of pattern layers. The ground plate is formed in a first pattern layer of the dielectric substrate and is used as a ground plane. The functional unit includes a plurality of conductive patches that are parasitic patterns formed in a second pattern layer different from the first pattern layer of the dielectric substrate. The conductive patches are periodically arranged, and sides of the conductive patches along at least one direction are set at a length such that a radio wave propagates through the surface of the dielectric substrate undergoes resonance. That is, the sides of the conductive patches along at least one direction are set at the length to cause resonance of a surface wave.

According to such a configuration, as a result of the surface wave resonating on the conductive patches belonging to the functional unit, a propagation loss of the surface wave increases. This results in preventing radiation from the conductive patches due to the surface wave, radiation from a substrate edge of the surface wave that has reached an end portion of the dielectric substrate, and the like, so that it is possible to prevent the antenna characteristics from being influenced due to the surface wave.

Embodiments of the present disclosure will be described below with reference to the drawings.

1. First Embodiment

1-1. Configuration

A configuration of a high-frequency device 1 according to the present embodiment will be described with reference to FIG. 1 and FIG. 2.

The high-frequency device 1 includes a dielectric substrate 2, a ground plate 4, and a functional unit 5.

The dielectric substrate 2 is a rectangular plate member formed with a dielectric and having a thickness. In the following description, a first plate surface among two plate surfaces of the dielectric substrate 2 will be referred to as a substrate front surface 2*a*, and a second plate surface will be referred to as a substrate back surface 2*b*. Both the substrate front surface 2*a* and the substrate back surface 2*b* are used as pattern layers. Further, a direction along one side of the rectangular dielectric substrate 2 will be referred to as an X axis direction, a direction along a side orthogonal to the one side will be referred to as a Y axis direction, and a normal direction of the substrate front surface 2*a* will be referred to as a Z axis direction. However, a shape of the dielectric substrate 2 is not limited to a rectangle, and the dielectric substrate 2 may have any shape.

The ground plate 4, which is a copper pattern formed so as to cover the whole surface of the substrate back surface 2*b*, acts as a ground plane. In other words, the substrate back surface 2*b* corresponds to a first pattern layer.

The functional unit 5 is formed on at least part of the substrate front surface 2*a* and has a function of preventing propagation of a surface wave (hereinafter, a target surface wave) on the substrate front surface 2*a*. It is assumed here that the surface wave propagates rightward from a left side in FIG. 1 along the X axis direction. The functional unit 5 includes a plurality of conductive patches 50 that are periodically arranged in two dimensions. In other words, the substrate front surface 2*a* corresponds to a second pattern layer.

The conductive patches 50 are copper parasitic patterns all formed to have the same size and have the same rectangular shape. In the following description, one of a long side and a short side of each of the rectangular conductive patches 50 will be referred to as a first side and the other will be referred to as a second side. The plurality of conductive patches 50 are insulated from each other, and the first sides and the second sides are arranged at regular intervals respectively along the X axis direction and along the Y axis direction. In other words, the conductive patches 50 are arranged so that the first sides are along a propagation direction of the target surface wave. In FIG. 1, the long side of each of the conductive patches 50 formed in a rectangular shape is set as the first side.

The first side of each of the conductive patches 50 has a length of λg/2 when a guide wavelength of the target surface wave is set as λg. The guide waveguide λg is a wavelength of the target surface wave shortened at a shortening ratio in accordance with a dielectric constant of the dielectric substrate 2. However, the length of the first side does not have to be strictly λg/2 and is only required to be a length at which the target surface wave undergoes resonance. For example, the length of the first side may be different within a range of ±5% with respect to λg/2. Further, the first side of each of the conductive patches 20 does not have to strictly match the propagation direction of the target surface wave. For example, the first side may be inclined within a range of ±45° with respect to the propagation direction of the target surface wave.

1-2. Action

In the high-frequency device 1 configured in this manner, the target surface wave that propagates through the substrate front surface 2*a* along the X axis direction resonates on the first side that is along the X axis direction and has a length of λg/2, of each conductive patch 50 of the functional unit 5. Upon resonance, the target surface wave is subjected to a resistance loss at the conductive patches 50 and subjected to a dielectric loss at the dielectric substrate 2.

1-3. Effects

According to the first embodiment described in detail above, the following effects are provided.

(1*a*) In the high-frequency device 1, the target surface wave that propagates through the substrate front surface 2*a* is subjected to a loss by resonating on the conductive patches 50 belonging to the functional unit 5. As a result, radiation from the conductive patches 50 due to the target surface wave and radiation from a substrate edge, of the target surface wave that has reached an end portion of the dielectric substrate 2 can be prevented. In other words, it is possible to provide a radiation prevention effect of preventing radiation from the conductive patches 50 due to the target surface wave as well as a surface wave prevention effect of preventing propagation of the target surface wave.

(1*b*) In a case where a generation source of the target surface wave and other circuits are provided on the dielectric substrate 2, adverse influence due to the target surface wave on the other circuits can be prevented by providing the functional unit 5 between the generation source and the other circuits.

1-4. Modified Example

Figure 3:
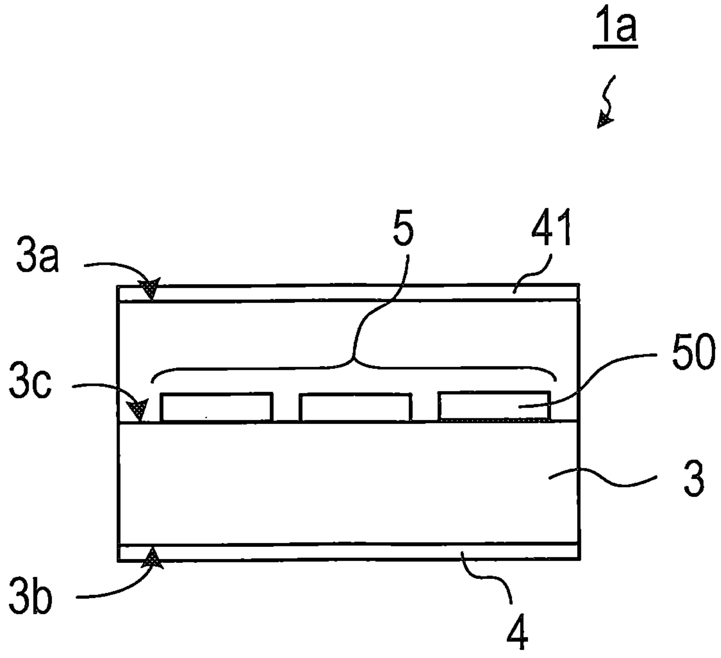
FIG. 3 is a vertical cross-sectional diagram illustrating a configuration of a high-frequency device in a modified example.

While in the high-frequency device 1 in the first embodiment, the dielectric substrate 2 including pattern layers in the substrate front surface 2*a* and the substrate back surface 2*b* is used, a structure of the dielectric substrate is not limited to this. For example, as in a high-frequency device 1*a* illustrated in FIG. 3, a multi-layer dielectric substrate 3 including pattern layers also in a substrate inner layer 3*c* in addition to the substrate front surface 3*a* and the substrate back surface 3*b* may be used. In this case, the functional unit 5 may be formed on the substrate inner layer 3*c*. However, the functional unit 5 is formed on a pattern layer adjacent to the pattern layer in which the ground plate 4 is formed across the dielectric layer. Note that a pattern 41 formed on the substrate front surface 3*a* may be a pattern functioning as a ground plane or may be a pattern functioning as a high-frequency circuit.

2. Second Embodiment

2-1. Differences from First Embodiment

A second embodiment has a basic configuration similar to that in the first embodiment, and thus, differences will be described below. Note that reference numerals that are the same as those in the first embodiment indicate the same components, and preceding description will be referred to.

Figure 4:
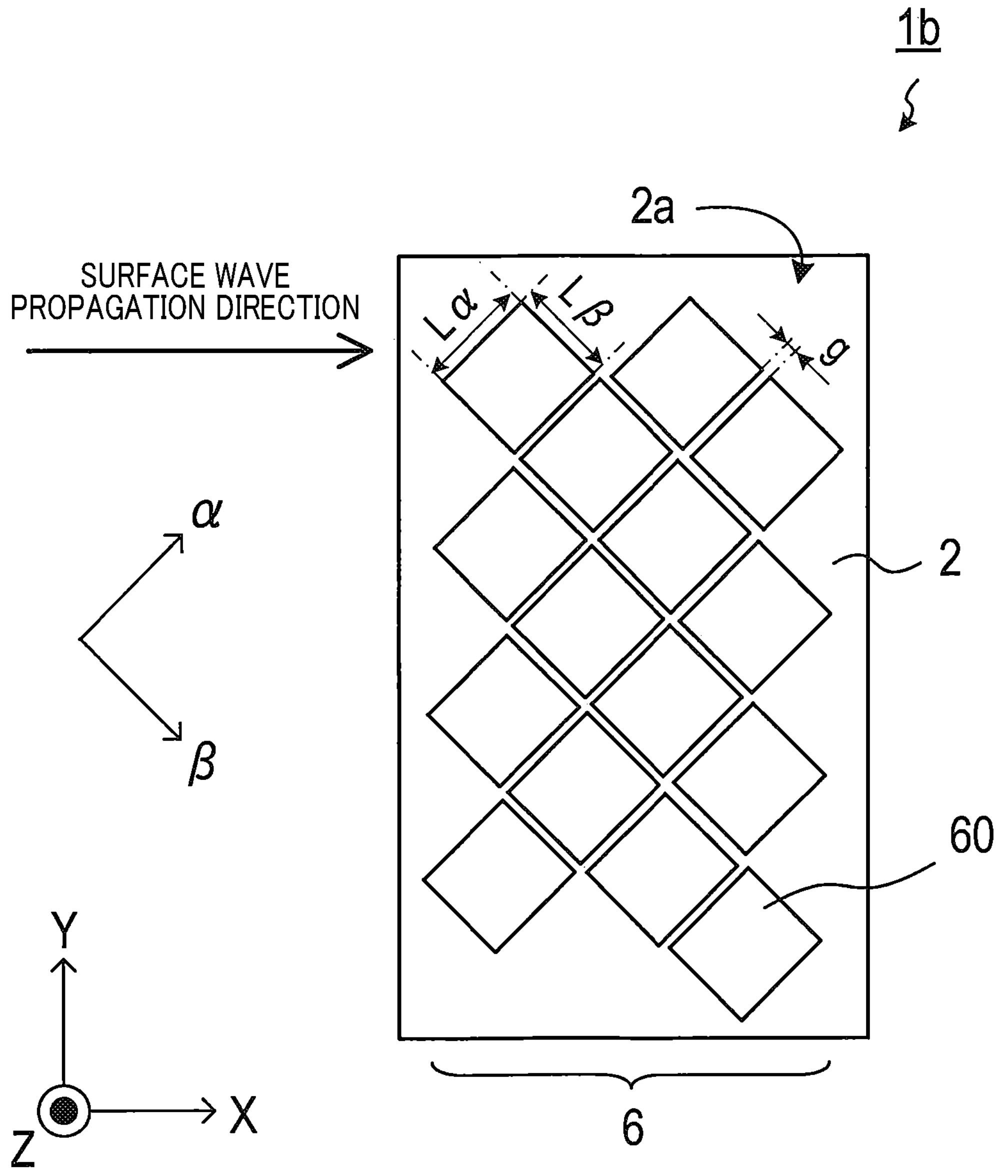
FIG. 4 is a plan view schematically illustrating a configuration of a high-frequency device according to a second embodiment.

In the high-frequency device 1 in the first embodiment described above, the conductive patches 50 are arranged so that the first sides of the conductive patches 50 belonging to the functional unit 5 are along the X axis direction (that is, the propagation direction of the target surface wave). In a high-frequency device 1*b* in the second embodiment, as illustrated in FIG. 4, conductive patches 60 are arranged so that both first sides and second sides of the conductive patches 60 belonging to a functional unit 6 are inclined by 45° in directions opposite to each other with respect to the X axis direction.

In the following description, a direction along the first side of each of the conductive patch 60 will be referred to as an $\alpha$ direction, and a direction along the second side will be referred to as a $\beta$ direction. The $\alpha$ direction and the $\beta$ direction are directions orthogonal to each other. A length $L\alpha$ of the first side along the $\alpha$ direction of each of the conductive patches 60 is different from a length $L\beta$ of the second side along the $\beta$ direction.

The plurality of conductive patches 60 are insulated from each other, are all inclined at the same angle, and are arranged at regular intervals in the $\alpha$ direction and in the $\beta$ direction.

In each of the conductive patches 60, the length $L\alpha$ of the first side is set at $\lambda g/2$. The length $L\beta$ of the second side is set so that a signal undergoes resonance with respect to the surface wave and a second phase of a signal that undergoes resonance on the second side becomes an opposite phase of a first phase of a signal that undergoes resonance on the first side. That is, a phase difference $\Delta\theta$ (hereinafter, a phase difference upon resonance) between the first phase and the second phase becomes 180°.

Figure 5:
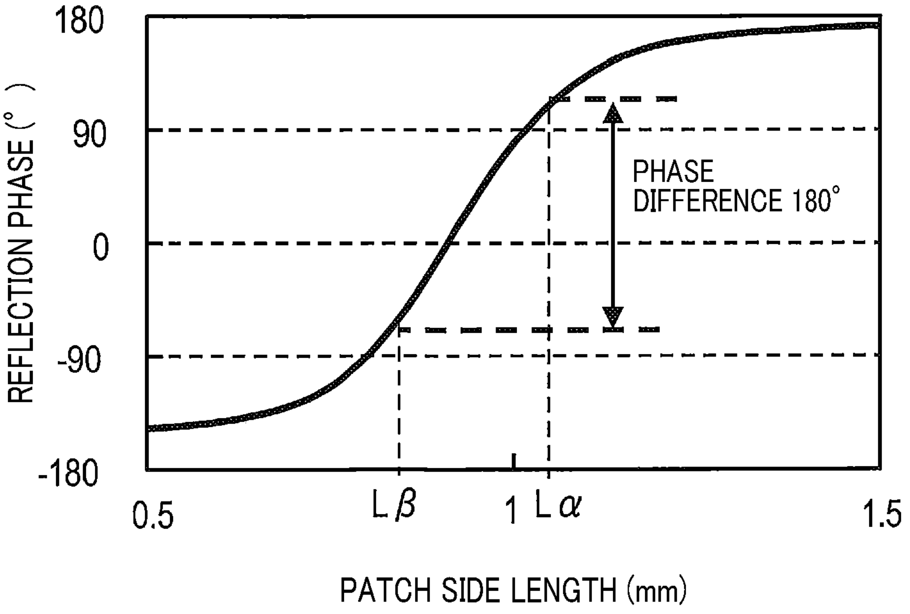
FIG. 5 is a graph indicating a relationship between a length of a side of a conductive patch and a reflection phase upon resonance.

As indicated in FIG. 5, there is correlation between the lengths $L\alpha$ and $L\beta$ of the sides of each of the conductive patches 60 and the phases of the signals that undergo resonance on the sides. The lengths $L\alpha$ and $L\beta$ of the sides of each of the conductive patches 60 are set so that the length $L\beta$ becomes such a length that the phase difference upon resonance $\Delta\theta$ becomes 180° by utilizing this correlation.

2-2. Operation

A case where the target surface wave is a horizontal polarized wave having a polarization plane along the X axis direction will be described. The $\alpha$ direction and the $\beta$ direction are respectively inclined by 45° with respect to the polarization plane of the target surface wave. When the target surface wave propagates, a current excited by the target surface wave flows along the first sides and the second sides of the conductive patches 60 and undergoes resonance in two directions of the $\alpha$ direction and the $\beta$ direction. In this event, the length $L\alpha$ of the first side is different from the length $L\beta$ of the second side, and thus, resonant lengths in the two directions are different. As a result of this, a phase difference occurs between the first phase of the signal that undergoes resonance on the first sides and the second phase of the signal that undergoes resonance on the second sides, that is, $\Delta\theta$ 0°, and thus, $\alpha$ direction of polarization of a radiated wave radiated from the conductive patches 60 becomes different from $\alpha$ direction of polarization of the target surface wave.

Figure 6:
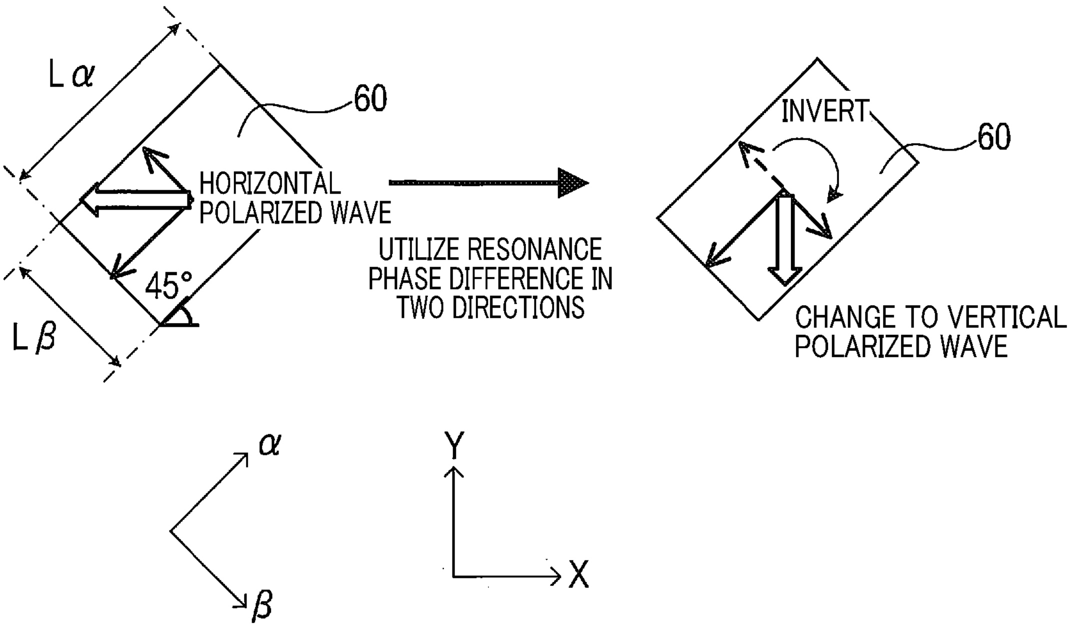
FIG. 6 is a view for explaining rotation action of a polarized wave by the conductive patch.

Particularly, in a case where $\Delta\theta$=180°, as illustrated in FIG. 6, the radiated wave radiated from the conductive patches 60 excited by the target surface wave changes from a horizontal polarized wave along the X axis direction of the target surface wave to a vertical polarized wave along the Y axis direction. This results in prevention of interference between a radio wave having a horizontal polarized wave that is the same as the polarized wave of the target surface wave and a radiation wave from the conductive patches 60 having the vertical polarized wave.

Figure 8:
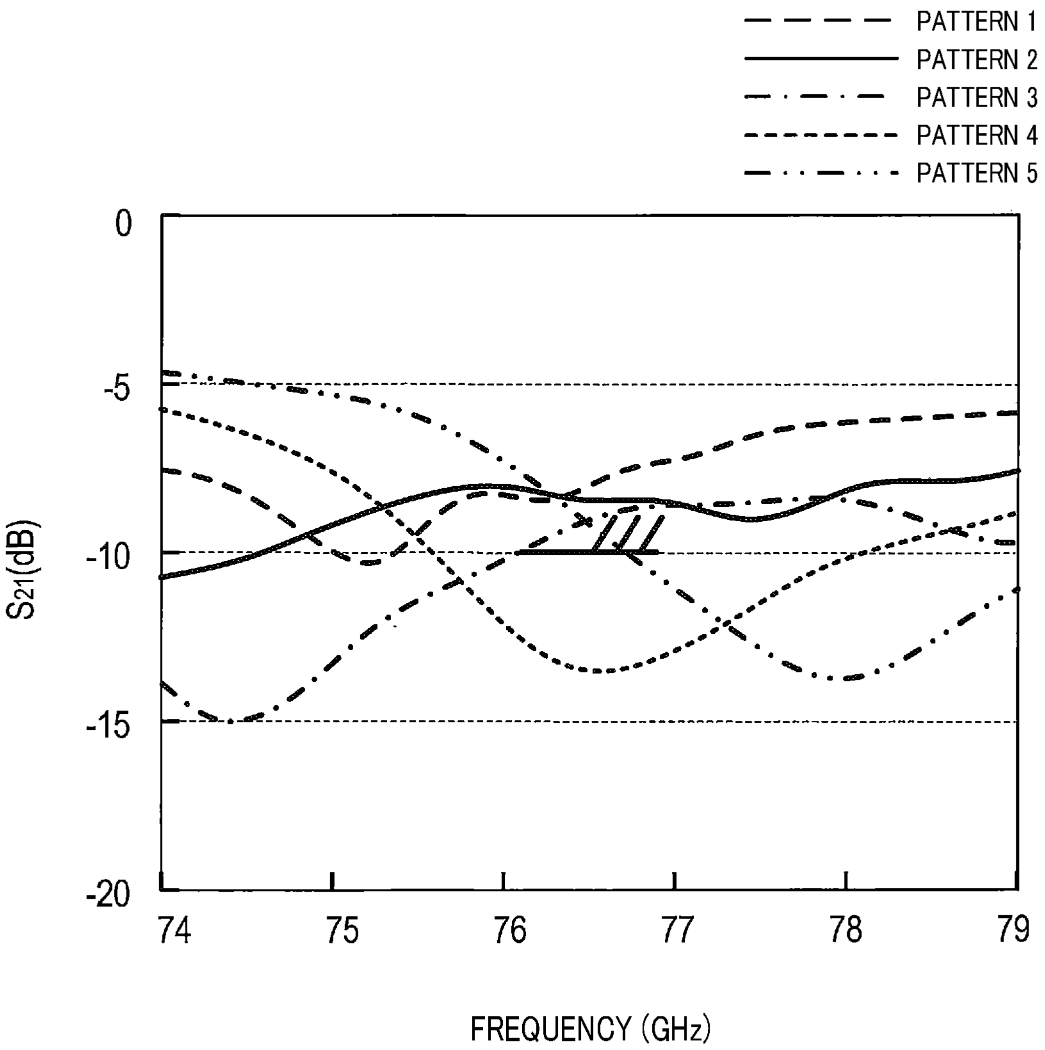
FIG. 8 is a graph indicating results of calculating, through simulations, frequency characteristics of forward direction transmission coefficients of the functional unit for each of the design examples illustrated in FIG. 7.

Here, FIG. 7 indicates combinations of parameters that reduce radiation from the conductive patches 60 by equal to or greater than 10 dB by changing the lengths $L\alpha$ and $L\beta$ of the sides of each of the conductive patches 60 and an arrangement interval g of the conductive patches 60. Specifically, the length $L\beta$ and the arrangement interval g are calculated through simulations by changing the length $L\alpha$ in a range of ±5% with respect to $\lambda g/2$. FIG. 8 indicates results of calculating, through simulations, propagation characteristics of the surface wave for each of combination pattern 1 to combination pattern 5 of parameters indicated in FIG. 7. It can be seen that in a case where the combination of parameters indicated as pattern 4 is used, both the radiation prevention effect and the surface wave prevention effect of equal to or greater than 10 dB can be obtained in the 76 GHz to 77 GHz band.

Figure 9:
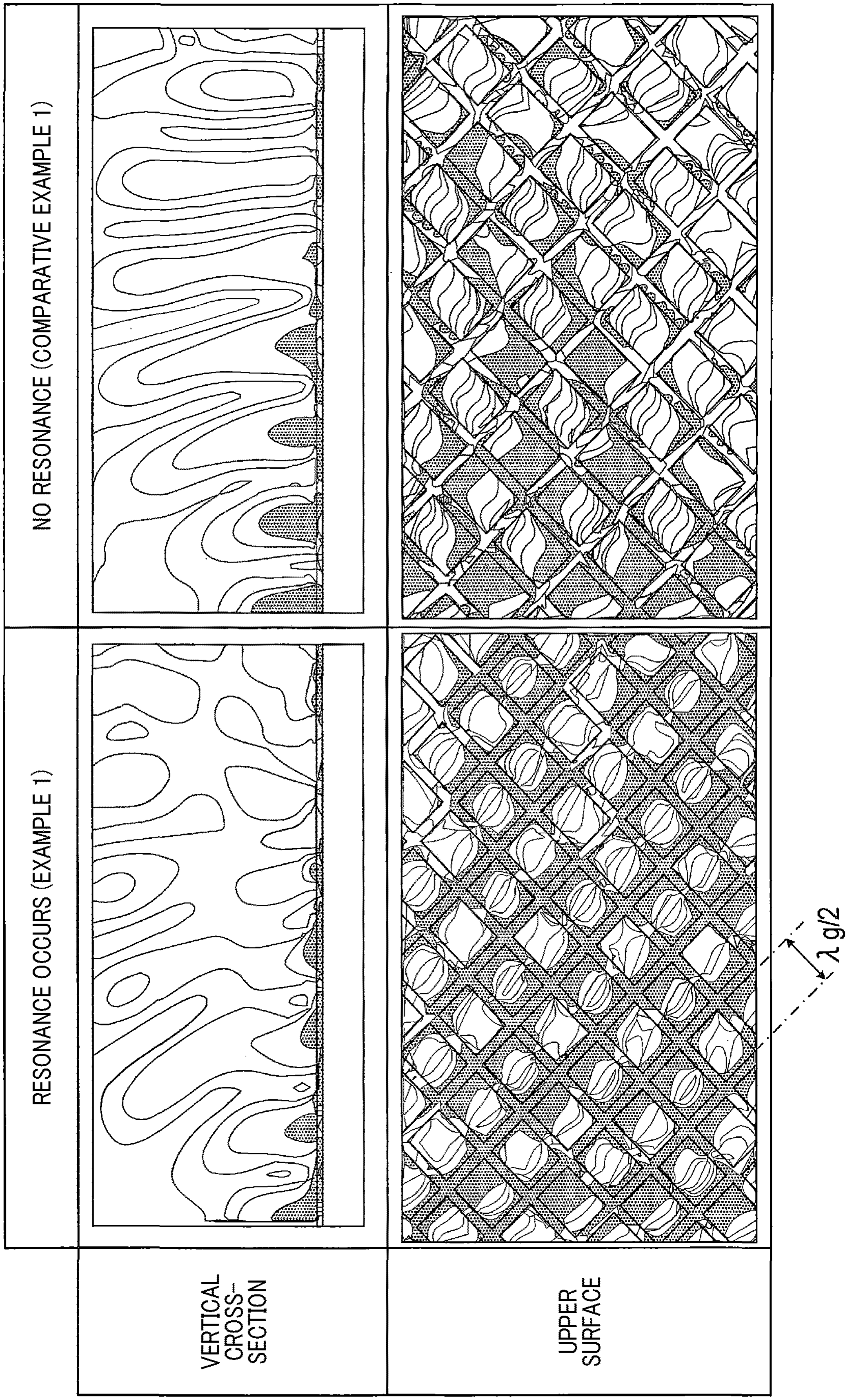
FIG. 9 is a view indicating results of calculating, through simulations, electric field distribution at the functional unit in example 1 and comparative example 1 designed so that strong resonance does not occur at each side.

FIG. 9 indicates results of calculating, through simulations, electric field distribution for example 1 and comparative example 1. Example 1 is the high-frequency device 1*b* designed so as to be able to obtain both the surface wave prevention effect and a reflection prevention effect. Comparative example 1 is a high-frequency device designed so that both the first side and the second side of each of the conductive patches 60 are different by equal to or greater than 5% from $\lambda g/2$, that is, so as not to cause strong resonance on each side.

In FIG. 9, a hatched portion is a portion where high electric field strength is observed. It can be seen from example 1 that a strong electric field is obtained at both ends in the $\alpha$ direction by resonance in the $\alpha$ direction along the first side of each conductive patch 60 and strength of an electric field radiated from the conductive patches 60 becomes low by propagation of the surface wave being prevented by resonance.

In comparative example 1, strong resonance does not occur at the conductive patches 60, and thus, strength of the electric field radiated from each conductive patch 60 becomes high by the surface wave propagating while keeping high strength.

2-3. Effects

According to the second embodiment described in detail above, the effects (1*a*) and (1*b*) of the first embodiment described above are provided, and further, the following effect is provided.

(2*a*) In the high-frequency device 1*b*, the radiation wave from the conductive patches 60 due to the target surface wave is converted to have a polarization plane different from the polarization plane of the target surface wave, so that it is possible to further prevent the radiation wave from interfering with a radio wave that is the same horizontal polarized wave as the target surface wave.

3. Third Embodiment

3-1. Differences from Second Embodiment

A third embodiment has a basic configuration similar to that of the second embodiment, and thus, differences will be described below. Note that reference numerals that are the same as those in the first and the second embodiments indicate the same components, and preceding description will be referred to.

Figure 10:
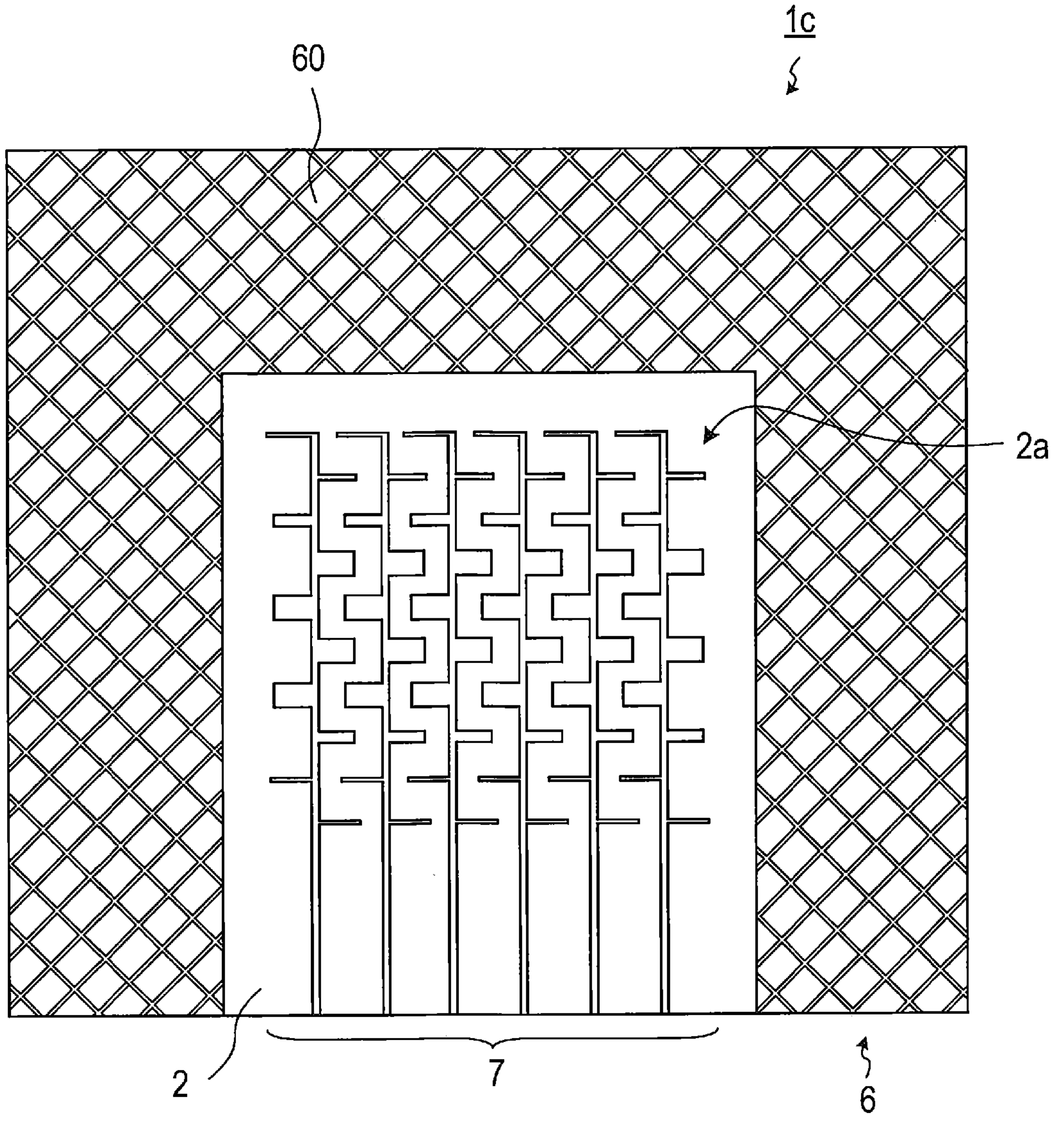
FIG. 10 is a plan view schematically illustrating a configuration of a high-frequency device according to a third embodiment.

In the high-frequency device 1*b* in the second embodiment described above, the functional unit 6 is provided on the substrate front surface 2*a*. As illustrated in FIG. 10, a high-frequency device 1*c* in the third embodiment is different from the high-frequency device 1*b* in the second embodiment in that an antenna unit 7 is provided on the substrate front surface 2*a* in addiction to the functional unit 6.

The high-frequency device 1*c* is, for example, used as an antenna device in a millimeter-wave radar for detecting various kinds of targets existing around a vehicle.

The antenna unit 7 has one or more antenna patterns acting as radiation elements that radiate radio waves at an operating frequency set in advance.

In the high-frequency device 1*c*, the antenna unit 7 is disposed around the center on the substrate front surface 2*a*, and the functional unit 6 is formed around the antenna unit 7 in three directions except one direction in which an electric supply line for the antenna unit 7 is wired. In FIG. 10, the functional unit 6 is formed in directions other than a downward direction toward the antenna unit 7, that is, in an upward direction and in a leftward-rightward direction.

The antenna unit 7 has a polarization plane along the X axis direction in the drawing and transmits a linearly polarized wave (that is, a horizontal polarized wave) having a guide wavelength of λg.

3-2. Experiments

Figure 11:
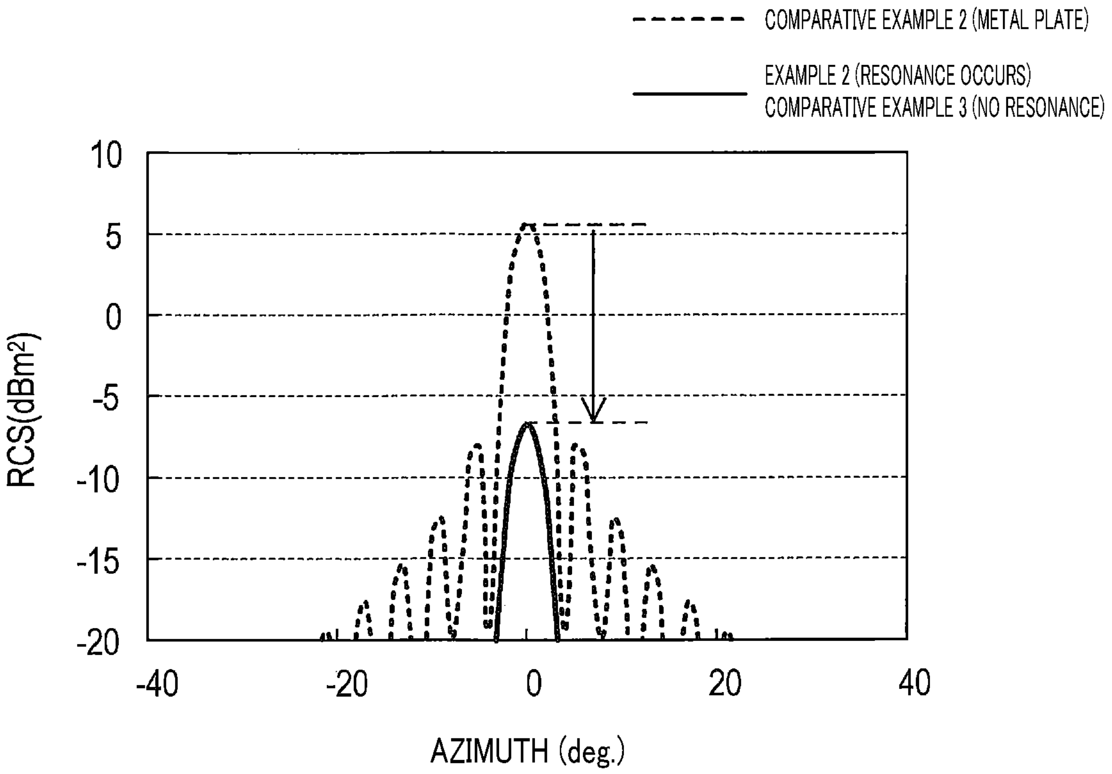
FIG. 11 is a graph indicating results of calculating, through simulations, a reflection cross-sectional area in example 2, comparative example 2 in which the functional unit is not provided, and comparative example 3 in which the functional unit is provided but a side is not set at $\lambda g/2$.

Results of measuring a radar cross section (hereinafter, RCS) of the high-frequency device 1*c* (hereinafter, example 2) including the functional unit 6 are indicated in FIG. 11. RCS of a simple metal plate not including the functional unit 6 is indicted together as comparative example 2.

Int can be seen in the high-frequency device 1*c* (that is, example 2) that RCS in directions other than a front direction can be reduced to a sufficiently small value by the functional unit 6 being provided, compared to comparative example 2. Note that measurement results similar to those in example 2 can be obtained also in comparative example 3 in which a structure similar to the structure of the functional unit 6 is provided, and both the lengths Lα and Lβ of the sides of each conductive patch 60 are set so that a radio wave transmitted by the antenna unit 7 does not undergo resonance.

Figure 12:
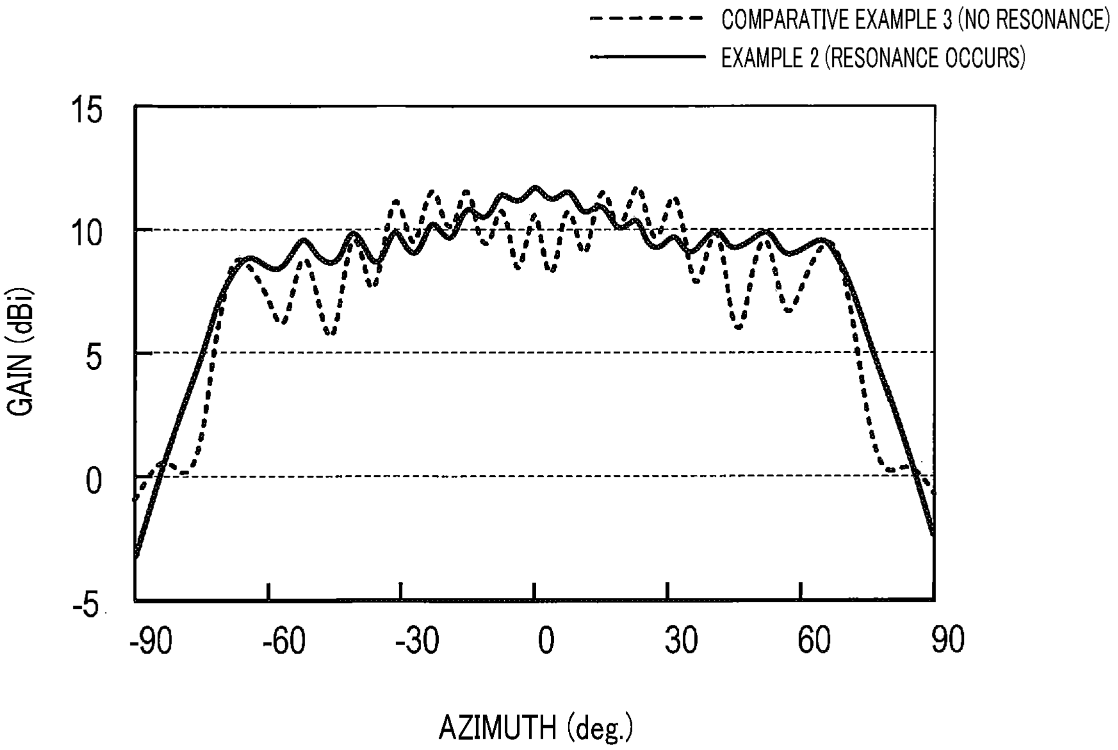
FIG. 12 is a graph indicating results of calculating, through simulations, antenna characteristics indicating change of a gain with respect to azimuth in example 2 and comparative example 3.

Antenna characteristics of example 2 and comparative example 3 are indicated in FIG. 12.

In comparative example 3, the radiation wave from the conductive patches 60 due to the surface wave is prevented from affecting characteristics of the antenna unit 7 by rotation of the polarization plane. However, the radiation wave from the substrate edge due to the surface wave becomes an interference wave with respect to the radiated wave from the antenna unit 7, affects the antenna characteristics and, specifically, causes large gain fluctuations depending on azimuth. In example 2, resonance of the surface wave at the conductive patches 60 prevents propagation of the surface wave from the antenna unit 7 toward the substrate edge and reduces radiation at the substrate edge (that is, an interference wave), thereby preventing gain fluctuation.

3-3. Effects

According to the third embodiment described in detail above, the effects (1*a*), (1*b*) and (2*a*) of the first and the second embodiments described above are provided, and further, the following effect is provided.

(3*a*) In the high-frequency device 1*c*, by the functional unit 6 provided between the antenna unit 7 and the end portion of the substrate (that is, an edge of the dielectric substrate), propagation of the surface wave generated at the antenna unit 7, and eventually, the radiation at the substrate edge due to the surface wave are prevented. This results in prevention of disruption of antenna characteristics due to interference from radiation at the substrate edge, so that it is possible to improve antenna performance.

Note that the radiation at the substrate edge has the effect of expanding an angular range in which a desired gain can be obtained in the antenna characteristics, and thus, propagation characteristics of the functional unit 6 may be designed so that necessary radiation at the substrate end can be obtained.

4. Other Embodiments

While the embodiments of the present disclosure have been described above, the present disclosure is not limited to the embodiments described above and can be modified in various manners and implemented.

Figure 2:
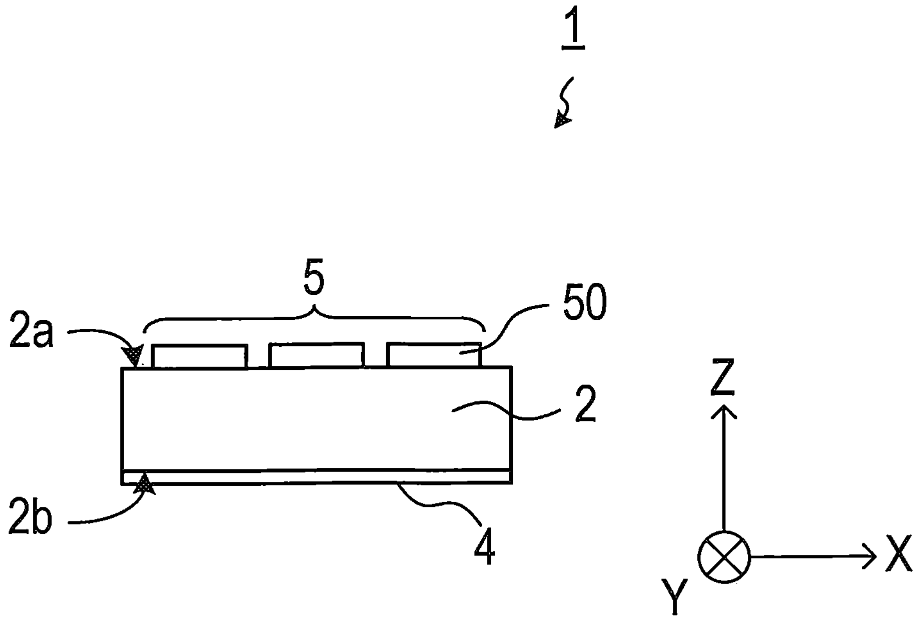
FIG. 2 is a vertical cross-sectional diagram illustrating a cross-section cut along a line II-II in FIG. 1.
Figure 13:
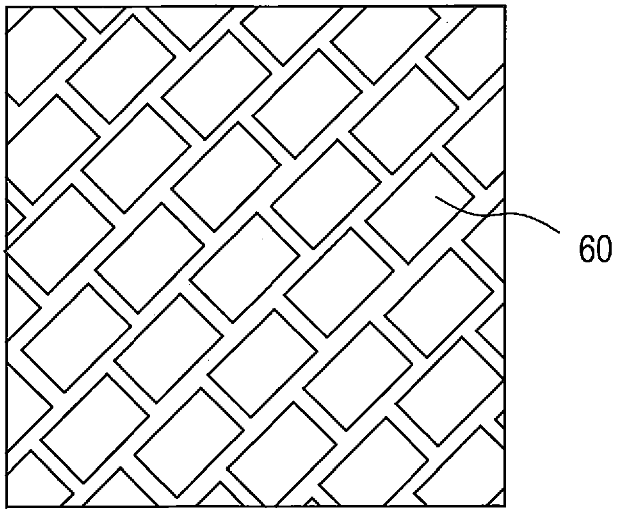
FIG. 13 is a view illustrating a modified example of an arrangement pattern of conductive patches that constitute a functional unit.

(4*a*) While in the above-described embodiments, as illustrated in FIG. 1 and FIG. 4, the conductive patches 50, 50 that constitute the functional units 5, 5 are arranged so that both the first sides and the second sides of the rectangles are arranged in line, an arrangement method of the conductive patches is not limited to this. For example, as illustrated in FIG. 13, the rectangular conductive patches 60 may be arranged so that only one of the first sides and the second sides are arranged in line.

Figure 14:
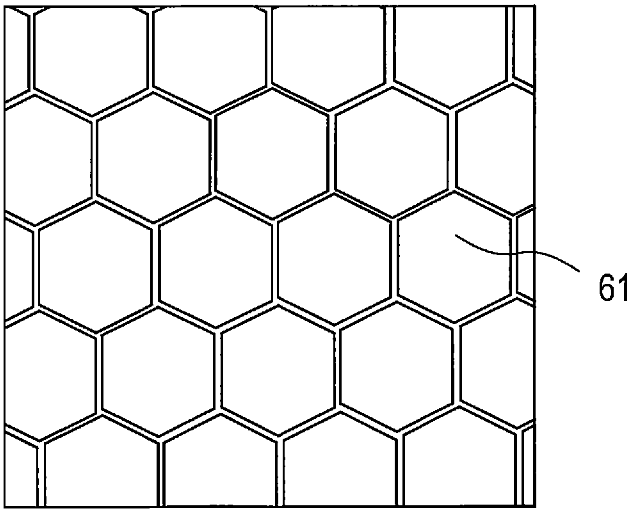
FIG. 14 is a view illustrating a modified example of the arrangement pattern of the conductive patches that constitute the functional unit.
Figure 15:
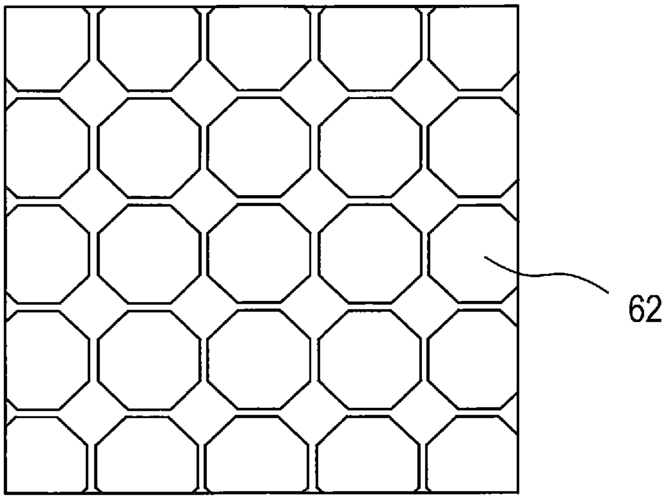
FIG. 15 is a view illustrating a modified example of the arrangement pattern of the conductive patches that constitute the functional unit.

(4*b*) While in the above-described embodiments, the rectangular conductive patches 50, 50 are used, a shape of the conductive patches is not limited to this. For example, conductive patches having an arbitrary polygonal shape such as hexagonal conductive patches 61 illustrated in FIG. 14 and octagonal conductive patches 62 illustrated in FIG. 15 may be used.

(4*c*) A plurality of functions of one component in the above-described embodiments may be implemented by a plurality of components, or one function of one component may be implemented by a plurality of components. Further, a plurality of functions of a plurality of components may be implemented by one component, or one function implemented by a plurality of components may be implemented by one component. Still further, part of the components of the above-described embodiments may be omitted. Further, at least part of the components of the above-described embodiments may be added to or replaced with the components of the above-described other embodiments.

(4*d*) The present disclosure can be implemented in various forms such as a system including the high-frequency devices 1 and 1*a* to 1*c* as components, a method for preventing unnecessary radiation, and the like, as well as the high-frequency devices 1 and 1*a* to 1*c*.

What is claimed is:

1. A high-frequency device comprising:

a dielectric substrate including a plurality of pattern layers;

a ground plate formed in a first pattern layer of the dielectric substrate and used as a ground plane; and a functional unit including a plurality of conductive patches that are parasitic patterns formed in a second pattern layer different from the first pattern layer of the dielectric substrate, wherein:

the conductive patches are periodically arranged, and sides of the conductive patches along at least one designated direction are set a length to cause resonance of a radio wave that propagates through a surface of the dielectric substrate;

the sides of the conductive patches are set to cause resonance of the radio wave;

the sides of the conductive patches have a length within a range of ±5% with respect to ½ of a guide wavelength of the radio wave;

an arrangement interval of the conductive patches is set based on the length of at least one of the sides of the conductive patches, the arrangement interval comprising an interval between the conductive patches;

each conductive patch has a first side and a second side, the first and second sides crossing each other; and the length of the second side of the conductive patch and the arrangement interval of the conductive patches are set based on the length of the first side of the conductive patch to reduce radiation from the conductive patches by equal to or greater than 10 dB, the length of the first side of the conductive patch being within the range of ±5% with respect to ½ of the guide wavelength of the radio wave.

2. The high-frequency device according to claim 1, wherein the conductive patches are polygons and are periodically arranged along arrangement directions that are directions respectively along one or more sides among a plurality of sides of each of the polygons.

3. The high-frequency device according to claim 2, wherein the conductive patches are rectangles and are arranged in the arrangement directions that are two directions respectively along two orthogonal sides.

4. The high-frequency device according to claim 1, wherein:

the dielectric substrate includes three or more pattern layers; and the functional unit is formed in an inner pattern layer disposed between dielectric layers from both surfaces.

5. The high-frequency device according to claim 1, wherein:

an antenna unit having one or more antenna patterns that act as radiation elements is formed in the second pattern layer; and the plurality of conductive patches are arranged between the antenna unit and an end portion of the dielectric substrate.

6. The high-frequency device according to claim 1, wherein:

an antenna unit having one or more antenna patterns that act as radiation elements and radiate linearly polarized wave is formed in the second pattern layer; and the plurality of conductive patches are configured so as to generate a radiation wave having a phase opposite to an incident wave having an operating frequency of the antenna unit in two directions inclined with respect to a polarization direction of a radiated wave radiated from the antenna unit.

7. The high-frequency device according to claim 6, wherein each of the conductive patches has two sides inclined by 45° in directions opposite to each other with respect to the polarization direction of the radiated wave.

8. The high-frequency device according to claim 1, wherein the arrangement interval of the conductive patches is an interval in at least one of a first direction and a second direction, the first direction corresponding to a direction along a first side of a conductive patch, the second direction corresponding to a direction along a second side of the conductive patch, and the first side and the second side crossing each other.

* * * * *